United States Patent
Hara (10) Patent No.: US 9,549,281 B2
(45) Date of Patent: Jan. 17, 2017

(54) COMMUNICATION APPARATUS, CONTROL METHOD FOR COMMUNICATION APPARATUS, AND PROGRAM

(71) Applicant: CANON KABUSHIKI KAISHA, Tokyo (JP)

(72) Inventor: Kenichiroh Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/801,143

(22) Filed: Jul. 16, 2015

(65) Prior Publication Data

US 2016/0029151 A1 Jan. 28, 2016

(30) Foreign Application Priority Data

Jul. 25, 2014 (WO) .................. PCT/JP2014/069726

(51) Int. Cl.
| | | |
|---|---|---|
| H04W 4/00 | (2009.01) | |
| H04W 40/24 | (2009.01) | |
| H04W 76/02 | (2009.01) | |
| H04W 76/06 | (2009.01) | |
| H04B 5/00 | (2006.01) | |

(52) U.S. Cl.
CPC ........... *H04W 4/008* (2013.01); *H04W 40/244* (2013.01); *H04W 76/023* (2013.01); *H04W 76/06* (2013.01); *H04B 5/0031* (2013.01)

(58) Field of Classification Search
CPC .. H04W 4/008; H04W 76/023; H04W 40/244; H04W 76/06; H04B 5/0031
See application file for complete search history.

(56) References Cited

U.S. PATENT DOCUMENTS

| | | | | |
|---|---|---|---|---|
| 2006/0040705 A1* | 2/2006 | Kawakami | ............ | H04L 45/122 455/561 |
| 2010/0146129 A1* | 6/2010 | Nakahara | ............... | H04W 48/12 709/228 |
| 2010/0220605 A1* | 9/2010 | Fujii | ........................ | H04L 67/14 370/252 |
| 2011/0058500 A1* | 3/2011 | Nagasaki | ............... | H04W 8/183 370/254 |
| 2013/0260683 A1* | 10/2013 | Suzuki | .................. | H04W 4/008 455/41.1 |
| 2013/0335584 A1* | 12/2013 | Kato | ........................ | G06F 3/005 348/207.1 |
| 2015/0139210 A1* | 5/2015 | Marin | .................... | H04W 12/04 370/338 |
| 2015/0295802 A1* | 10/2015 | Balakrishnan | ...... | H04L 43/0811 370/248 |

FOREIGN PATENT DOCUMENTS

| | | | |
|---|---|---|---|
| JP | 2007-258823 A | 10/2007 | |
| JP | 2010-103693 A | 5/2010 | |
| JP | 2011-124960 A | 6/2011 | |
| JP | 2013-157736 A | 8/2013 | |
| JP | 2014-120804 A | 6/2014 | |

\* cited by examiner

*Primary Examiner* — Andrew Wendell
(74) *Attorney, Agent, or Firm* — Canon USA, Inc., IP Division (57) ABSTRACT

A communication parameter is shared with an external apparatus and is held via second communication different from first communication. In the case where a connection with the external apparatus, which is started in response to sharing of the communication parameter, is disconnected, a communication parameter used in the disconnected connection is deleted.

15 Claims, 7 Drawing Sheets

COMMUNICATION APPARATUS, CONTROL METHOD FOR COMMUNICATION APPARATUS, AND PROGRAM

TECHNICAL FIELD

The present invention relates to a communication apparatus that can communicate with an external apparatus through wireless communication.

BACKGROUND ART

In recent years, digital cameras that can connect to a mobile phone through wireless communication and exchange image data have been known. In order to omit part of a procedure that the user needs to operate in order to establish a connection through wireless communication, technology for sharing communication parameters for establishing a connection through wireless communication by using other wireless communication (so-called hand over) is known. For example, PTL 1 discloses sharing, between devices, of communication parameters for connecting the devices via a wireless LAN (Local Area Network) by using NFC (Near Field Communication).

In a so-called smart phone, the communication parameters of a wireless LAN in which the smart phone has participated in the past are recorded as a log, thereby simplifying a procedure for establishing the connection again.

CITATION LIST

Patent Literature

PTL 1 Japanese Patent Laid-Open No. 2013-157736

In general, the communication parameters of a network are more secure when they are randomly generated every time a network is generated than having fixed communication parameters. In particular, security needs to be taken into more consideration since it is easy to read NFC tag information in hand over from NFC-based communication to wireless LAN-based communication. However, randomly generating communication parameters whenever a network is generated leaves the randomly-generated communication parameters in the log of the network of a mobile phone. In other words, more and more communication parameters that will not be used again will be left in the log every time communication is performed, and this may hinder, for example, the user when selecting desired communication parameters from the log. This point is not taken into consideration at all in PTL 1.

SUMMARY OF INVENTION

It is an object of the present invention to appropriately manage the log of wireless communication with another apparatus.

In order to achieve the foregoing object, a communication apparatus according to the present invention includes sharing means for sharing a communication parameter for establishing a connection with an external apparatus via first communication, with the external apparatus via second communication different from the first communication; holding means for holding the communication parameter shared by the sharing means; retrieval means for retrieving a beacon from the external apparatus; first connection means for establishing a connection with the external apparatus via the first communication, on the basis of the beacon retrieved by the retrieval means and the communication parameter held by the holding means; disconnection means for disconnecting the connection with the external apparatus via the first communication; and deletion means for deleting, in response to disconnection by the disconnection means of the connection with the external apparatus via the first communication, which is started in response to sharing of the communication parameter by the sharing means, the communication parameter used in the disconnected connection, among communication parameters held by the holding means.

According to the present invention, the log of wireless communication with another apparatus can be appropriately managed.

Further features of the present invention will become apparent from the following description of exemplary embodiments with reference to the attached drawings.

DESCRIPTION OF EMBODIMENTS

Hereinafter, embodiments of the present invention will be described in detail with reference to the drawings.

Note that the embodiments described below are examples serving as means for implementing the present invention, and modifications or changes shall be appropriately made depending on the configuration of an apparatus to which the present invention is applied or various conditions. It is also possible to appropriately combine the embodiments.

First Embodiment

Configuration of Digital Camera

Figure 1A:
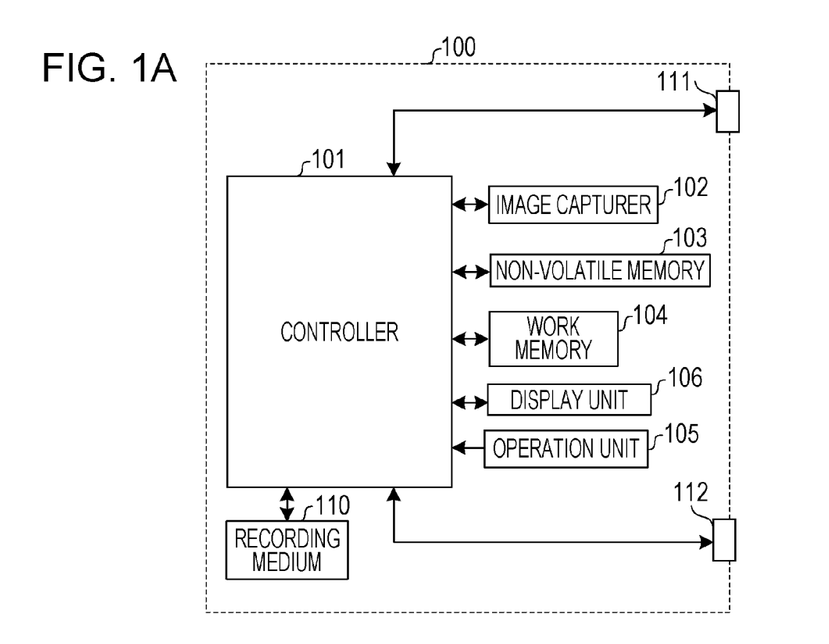
FIGS. 1A-1C includes a block diagram illustrating the configuration of a digital camera 100 according to a first embodiment and diagrams illustrating an exemplary external appearance of the digital camera 100.

FIG. 1A is a block diagram illustrating an exemplary configuration of a digital camera 100 which is an example of a communication apparatus according to this embodiment. Although a digital camera will be discussed as an example of the communication apparatus, the communication apparatus is not limited thereto. For example, the communication apparatus may be a portable medium player, a so-called tablet device, or an information processing apparatus such as a personal computer.

A controller 101 controls the units of the digital camera 100 in accordance with input signals and a later-described program. Instead of the controller 101 controlling the entire apparatus, a plurality of hardware parts may control the entire apparatus by sharing the processing.

An image capturer 102 includes, for example, an optical lens unit, an optical system that controls a diaphragm, zooming, and focusing, and an image pickup device for converting light (video image) introduced via the optical lens unit to an electrical video signal. As the image pickup device, a CMOS (Complementary Metal Oxide Semiconductor) or a CCD (Charge Coupled Device) is generally used. Under control of the controller 101, the image capturer 102 converts subject light focused by lenses included in the image capturer 102 to an electric signal with the use of the image pickup device, performs noise reduction processing and the like, and outputs digital data as image data. In the digital camera 100 according to this embodiment, the image data is recorded in a recording medium 110 that conforms to the standards of DCF (Design Rule for Camera File System).

A non-volatile memory 103 is an electrically erasable/recordable non-volatile memory, and stores a later-described program executed by the controller 101, for example.

A work memory 104 is used as a buffer memory that temporarily holds image data captured by the image capturer 102, an image display memory for a display unit 106, a work area for the controller 101, or the like.

An operation unit 105 is used to accept an instruction for the digital camera 100 from a user. The operation unit 105 includes, for example, a power button for giving an instruction from the user to turn ON/OFF the power of the digital camera 100, a release switch for giving an image capturing instruction, and a play button for giving an instruction to play image data. The operation unit 105 further includes an operation member such as a connection button dedicated to start communication with an external device via a later-described connection unit 111. The operation unit 105 also includes a touchscreen formed on the later-described display unit 106. Note that the release switch includes a SW1 and a SW2. The SW1 is turned ON when the release switch is so-called half-pressed. Accordingly, an instruction for preparing for image capturing, such as AF (auto focus) processing, AE (auto exposure) processing, AWB (auto white balance) processing, and EF (pre-flash) processing, is accepted. The SW2 is turned ON when the release switch is so-called full-pressed. Accordingly, an instruction for capturing an image is accepted.

The display unit 106 displays a viewfinder image in the case of capturing an image, displays captured image data, displays characters for interactive operation, or the like. Note that the digital camera 100 need not include the display unit 106. It is only necessary for the digital camera 100 to be able to connect to the internal or external display unit 106 and at least to have a display control function for controlling display of the display unit 106.

The recording medium 110 can record image data output from the image capturer 102. The recording medium 110 may be configured to be removable from the digital camera 100 or may be included in the digital camera 100. That is, it is only necessary for the digital camera 100 to at least have means for accessing the recording medium 110.

The connection unit 111 is an interface for connecting to an external apparatus. The digital camera 100 according to this embodiment can exchange data with an external apparatus via the connection unit 111. For example, image data generated by the image capturer 102 can be transmitted to an external apparatus via the connection unit 111. In this embodiment, the connection unit 111 includes an interface for communicating with an external apparatus using a so-called wireless LAN that conforms to the standards of IEEE 802.11. The controller 101 implements wireless communication with an external apparatus by controlling the connection unit 111. Note that the communication system is not limited to a wireless LAN and includes, for example, an infrared communication system. The connection unit 111 is an example of first wireless communication means.

A near-field wireless communication unit 112 includes, for example, a modulator/demodulator circuit and a communication controller for processing wireless signals for an antenna for wireless communication. The near-field wireless communication unit 112 outputs a modulated wireless signal from the antenna, and demodulates a wireless signal received by the antenna. This implements contactless near-field communication that conforms to the standards of ISO/IEC 18092 (so-called NFC: Near Field Communication). The near-field wireless communication unit 112 according to this embodiment is arranged at a side portion of the digital camera 100.

Figure 2:
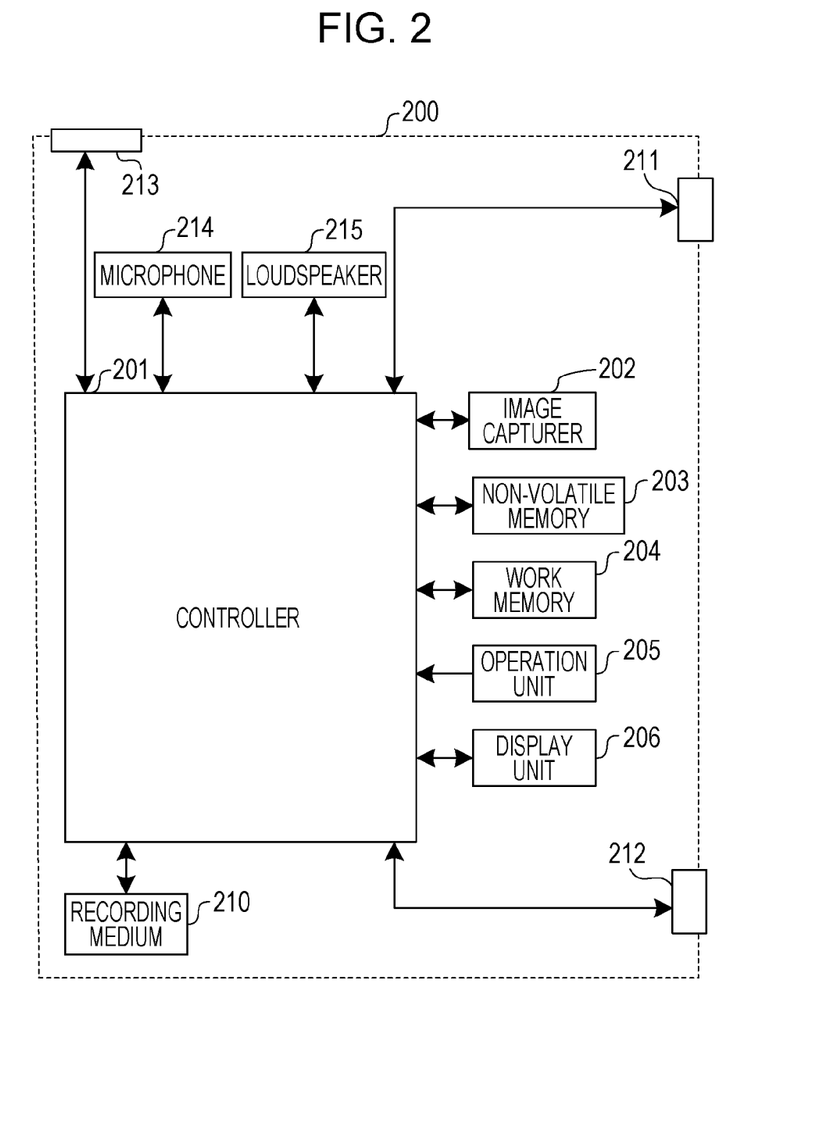
FIG. 2 is a block diagram illustrating the configuration of a mobile phone 200 according to the first embodiment.

By bringing the near-field wireless communication unit 112 of the digital camera 100 and a near-field wireless communication unit 212 of a later-described mobile phone 200 close to each other, communication is started and the digital camera 100 and the mobile phone 200 are connected. In the case of connecting to the mobile phone 200 using the near-field wireless communication unit 112, it is not necessarily required to bring the near-field wireless communication unit 112 and the near-field wireless communication unit 212 into contact with each other. Since the near-field wireless communication unit 112 of the digital camera 100 and the near-field wireless communication unit 212 of the mobile phone 200 can communicate with each other even at a certain distance, it is only necessary to bring the near-field wireless communication units 112 and 212 close enough to be capable of performing near-field wireless communication in order to connect the digital camera 100 and the mobile phone 200. In the following description, bringing the near-field wireless communication units 112 and 212 close enough to be capable of performing near-field wireless communication may also be referred to as bringing these units 112 and 212 close to each other.

Communication will not be started when the near-field wireless communication unit 112 of the digital camera 100 and the near-field wireless communication unit 212 of the mobile phone 200 are within a range where near-field wireless communication is impossible. Processing is not executed when the digital camera 100 and the mobile phone 200, which are connected to each other through near-field wireless communication, become separated and the near-field wireless communication unit 112 of the digital camera 100 and the near-field wireless communication unit 212 of the mobile phone 200 are within a range where near-field wireless communication is impossible. Note that contactless near-field communication implemented by the near-field wireless communication unit 112 is not limited to NFC, and other wireless communication may be adopted. For example, contactless near-field communication that conforms to the standards of ISO/IEC 14443 may be adopted as contactless near-field communication implemented by the near-field wireless communication unit 112.

In this embodiment, the communication speed of communication implemented by the connection unit 111 is faster than the communication speed of communication implemented by the later-described near-field wireless communication unit 112. In addition, communication implemented by the connection unit 111 has a wider communicable range than that of communication performed by the near-field wireless communication unit 112. Instead, communication performed by the near-field wireless communication unit 112 can limit a communication partner due to the narrowness of the communicable range, and processing such as exchanging a cryptographic key necessary for communication implemented by the connection unit 111 is unnecessary. That is, communication can be more easily performed than using the connection unit 111.

The connection unit 111 of the digital camera 100 according to this embodiment has an access point mode (hereinafter, AP mode) in which the connection unit 111 operates as an access point in an infrastructure mode. The connection unit 111 further has a client mode (hereinafter, CL mode) in which the connection unit 111 operates as a client in the infrastructure mode. By causing the connection unit 111 to operate in the CL mode, the digital camera 100 according to this embodiment can operate as a CL device in the infrastructure mode. In the case where the digital camera 100 operates as a CL device, establishing a connection with a peripheral AP device enables participation in a network formed by the AP device. By causing the connection unit 111 to operate in the AP mode, the digital camera 100 according to this embodiment can operate as a simplified AP which is one type of AP but has more limited functions (hereinafter, simple AP). In the case where the digital camera 100 operates as a simple AP, the digital camera 100 forms a network by itself. A peripheral apparatus of the digital camera 100 recognizes the digital camera 100 as an AP device, and the peripheral apparatus can participate in a network formed by the digital camera 100. It is assumed that a program for causing the digital camera 100 to operate as described above is held in the non-volatile memory 103.

Although the digital camera 100 according to this embodiment is one type of AP, the digital camera 100 is a simple AP that does not have a gateway function for transferring data received from a CL device to an Internet provider or the like. Therefore, even when the digital camera 100 receives data from another apparatus participating in a network formed by the digital camera 100, the digital camera 100 cannot transfer the data to a network such as the Internet.

Figure 1B:
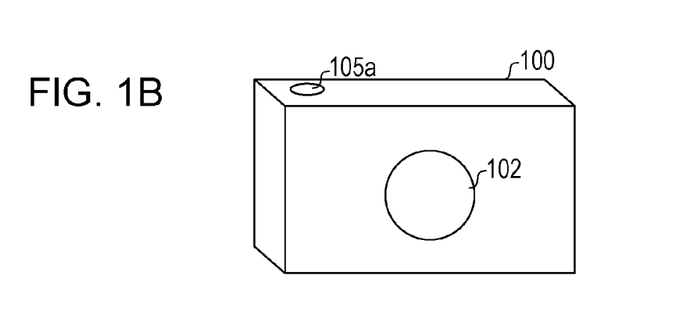
Figure 1C:
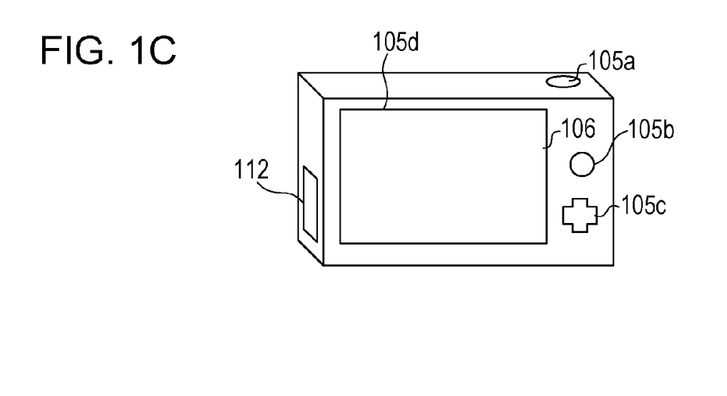

Next, the external appearance of the digital camera 100 will be described. FIGS. 1B and 1C are diagrams illustrating an exemplary external appearance of the digital camera 100. A release switch 105a, a play button 105b, a direction key 105c, and a touchscreen 105d are operation members included in the above-described operation unit 105. In addition, the display unit 106 displays an image obtained as a result of capturing an image by the image capturer 102. The digital camera 100 according to this embodiment has an antenna portion of the near-field wireless communication unit 112 on a side face of a camera casing. By bringing the near-field wireless communication units 112 close to the near-field wireless communication units 212 at a certain distance, near-field wireless communication with another device can be established. Accordingly, communication can be performed contactlessly without having a cable or the like, and a communication partner can be limited in accordance with the user's intention.

The above is the description of the digital camera 100.

Internal Configuration of Mobile Phone 200

FIG. 2 is a block diagram illustrating an exemplary configuration of the mobile phone 200 which is an example of an information processing apparatus according to this embodiment. Although a mobile phone will be discussed as an example of the information processing apparatus, the information processing apparatus is not limited thereto. For example, the information processing apparatus may be a digital camera, a tablet device, or a personal computer with a wireless function.

A controller 201 controls the units of the mobile phone 200 in accordance with input signals and a later-described program. Instead of the controller 201 controlling the entire apparatus, a plurality of hardware parts may control the entire apparatus by sharing the processing.

An image capturer 202 converts subject light focused by lenses included in the image capturer 202 to an electric signal, performs noise reduction processing and the like, and outputs digital data as image data. The captured image data is accumulated in a buffer memory, which is then subjected to predetermined arithmetic operation by the controller 201, and is recorded in a recording medium 210.

A non-volatile memory 203 is an electrically erasable/recordable non-volatile memory. The non-volatile memory 203 records an OS (operating system) which is basic software executed by the controller 201, and an application that implements applied functions in cooperation with the OS. In this embodiment, the non-volatile memory 203 stores an application (hereinafter, app) for communicating with the digital camera 100.

A work memory 204 is used as an image display memory for a display unit 206, a work area for the controller 201, or the like.

An operation unit 205 is used to accept an instruction for the mobile phone 200 from the user. The operation unit 205 includes, for example, a power button for giving an instruction from the user to turn ON/OFF the power of the mobile phone 200, and an operation member such as a touchscreen formed on the display unit 206.

The display unit 206 displays image data, displays characters for interactive operation, or the like. The mobile phone 200 need not include the display unit 206. It is only necessary for the mobile phone 200 to be able to connect to the display unit 206 and at least to have a display control function for controlling display of the display unit 206.

The recording medium 210 can record image data output from the image capturer 202. The recording medium 210 may be configured to be removable from the mobile phone 200 or may be included in the mobile phone 200. That is, it is only necessary for the mobile phone 200 to at least have means for accessing the recording medium 210.

A connection unit 211 is an interface for connecting to an external apparatus. The mobile phone 200 according to this embodiment can exchange data with the digital camera 100 via the connection unit 211. In this embodiment, the connection unit 211 is an antenna, and the controller 101 can connect to the digital camera 100 via the antenna. A connection with the digital camera 100 may be established directly or may be established via an access point. As a protocol for communicating data, for example, PTP/IP (Picture Transfer Protocol over Internet Protocol) through a wireless LAN can be used. Note that communication with the digital camera 100 is not limited to that described above. For example, the connection unit 211 may include a wireless communication module such as an infrared communication module, a Bluetooth (registered trademark) communication module, or Wireless USB.

The near-field wireless communication unit 212 is a communication unit for implementing contactless wireless communication with another device. The near-field wireless communication unit 212 includes a modulator/demodulator circuit and a communication controller for processing wireless signals for an antenna for wireless communication. The near-field wireless communication unit 212 implements contactless wireless communication by outputting a modulated wireless signal from the antenna, and demodulating a wireless signal received by the antenna. Here, contactless wireless communication that conforms to the standards of ISO/IEC 18092 (so-called NFC) is implemented. Upon receipt of a data read-out request from another device, the near-field wireless communication unit 212 outputs response data on the basis of data stored in the non-volatile memory 203. In this embodiment, the mobile phone 200 operates in a card reader mode, a card writer mode, and a P2P mode, which are defined in the NFC standards, through the near-field wireless communication unit 212, and mainly acts as an Initiator. In contrast, the digital camera 100 mainly acts as a Target via the near-field wireless communication unit 112.

A public network connection unit 213 is an interface used in performing public network wireless communication. The mobile phone 200 can make a call to another device via the public network connection unit 213. In this case, the controller 201 implements a call by inputting/outputting audio signals via a microphone 214 and a loudspeaker 215. In this embodiment, the public network connection unit 213 is an antenna, and the controller 101 can connect to a public network via the antenna. Note that the connection unit 211 and the public network connection unit 213 may share one antenna. In addition, generally communication via the connection unit 211 has a faster communication speed than communication via a public network. Therefore, the mobile phone 200 according to this embodiment gives priority to communication via the connection unit 211 in a state where no call is being made.

The above is the description of the mobile phone 200.

Software Configuration of Mobile Phone

Figure 3A:
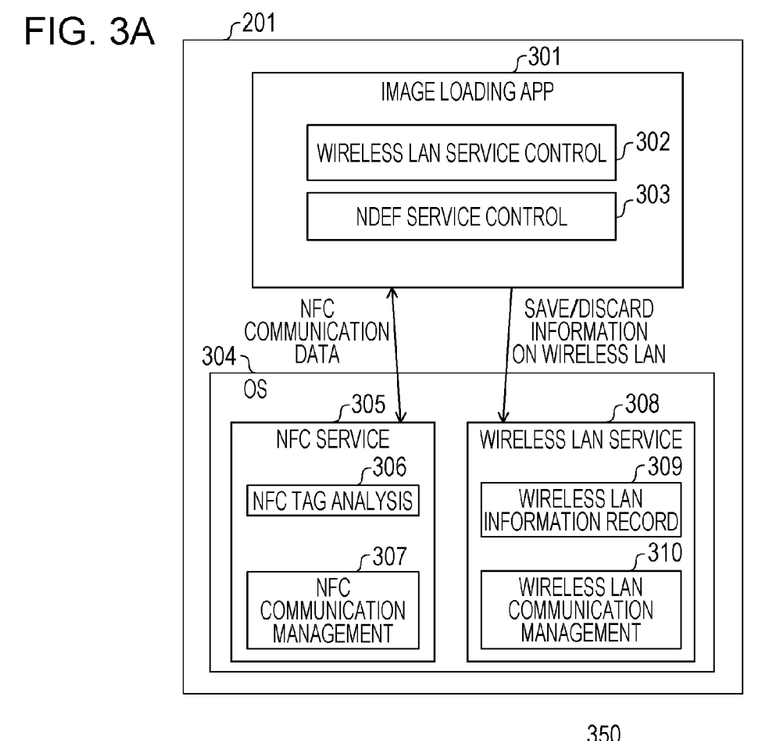
FIG. 3A is a conceptual diagram of the software configuration of the mobile phone 200 according to the first embodiment.

Next, the software configuration diagram of the mobile phone 200 according to the first embodiment will be described.

FIG. 3A is a software configuration diagram of the mobile phone 200. The non-volatile memory 203 of the mobile phone 200 records various types of fixed data and firmware.

The recording medium 210 records an OS (Operating System) 304 which is basic software executed by the controller 201, and an app which is applied software executed by the controller 201. In addition, as applied software, an image loading app 301 that connects to the digital camera 100 and loads an image is recorded. (Hereinafter, the image loading app 301 may also be written as the app 301.)

When the user turns on the power switch included in the operation unit 205 of the mobile phone 200, the mobile phone 200 is activated, and the controller 201 reads the OS 304 from the recording medium 210, expands the OS 304 in the work memory 204, and executes the OS 304. The controller 201 also controls the units of the mobile phone 200 in accordance with the OS 304 and an application installed on the OS. In the following description of FIG. 3A, the controller 201 executing certain processing in accordance with an app (or the function of the app, the OS or the service of the OS, or the like) will be represented as "an app (or the function of the app, the OS or the service of the OS, or the like) performing certain processing".

The OS 304 not only has the function of controlling the units of the mobile phone 200, but also provides various services to an app. As feature functions in this embodiment, the OS 304 has an NFC service 305 and a wireless LAN service 308.

The NFC service 305 controls, with the use of an NFC communication management module 307, NFC communication using the near-field wireless communication unit 212. Specifically, the NFC service 305 receives data via NFC communication using the near-field wireless communication unit 212, or, in response to a request from the image loading app 301 or the like, transmits data. The data received here is supplied to the image loading app 301 or the like.

An NFC tag analyzing module 306 determines and analyzes the structure of the received data, and changes the received data to a data structure appropriate for an app. Accordingly, the data, which has been made into a format that the app can analyze, can be supplied to the app, and vice versa.

In general, data exchanged in NFC communication conforms to the format of NDEF (NFC Data Exchange Format). Thus, the NFC tag analyzing module 306 has the function of determining whether the received data is in a format that conforms to NDEF.

The wireless LAN service 308 has the following functions, with the use of a wireless LAN communication management module 310. That is, the following are controlled: on/off control of a wireless LAN function, retrieval (scanning) of SSIDs of peripheral networks, participation in a network, and data communication using a wireless LAN. In addition, the following are controlled: providing data obtained by communication using a wireless LAN to an app, and transmission/reception of data via a wireless LAN in response to a request from an app. Further, processing for managing saving/discarding of communication parameters for establishing a wireless LAN connection is performed by a wireless LAN information record 309. Note that saving/discarding of communication parameters is also controlled in response to a request from an app.

Here, wireless LAN information managed by the wireless LAN communication management module 310 of the OS 304 will be described.

Figure 3B:
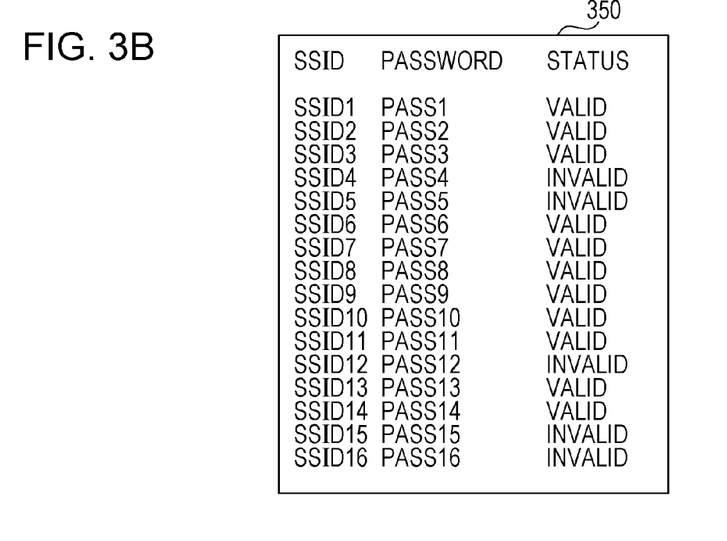
FIG. 3B is a conceptual diagram of a management table for describing a communication log of the mobile phone 200 according to the first embodiment.

FIG. 3B is a conceptual diagram of a management table for holding wireless LAN information managed by the wireless LAN communication management module 310 of the OS 304. A management table 350 here is recorded in, for example, the non-volatile memory 203 of the mobile phone 200.

In the management table 350, an SSID (Service Set Identifier) which is a communication parameter of a wireless LAN, and a password used in authentication processing at the time of participating in a network are recorded in association with each other. In the case of participating in a new network in response to a user instruction, communication parameters of that network are added to this management table. In addition, the OS may receive an instruction from an app, for example, and may add, in the management table, information for which the instruction has been given.

Further, the valid/invalid status is set for each SSID. This status is information that indicates, in the case where an SSID included in a beacon discovered by searching around matches an SSID in the management table, whether to automatically participate in a network of that SSID.

For example, in the case of participating in a wireless LAN, information in the management table is used as follows. That is, upon receipt of a beacon sent from a peripheral device, whether an SSID included in this beacon and a communication parameter of a valid wireless LAN in the management table satisfy a certain relationship is determined by the function of the wireless LAN service 308 of the OS 304. At this time, communication parameters whose status is invalid in the management table are not used in determination. On the basis of this determination result, a network to participate in is determined. Specifically, control is performed to promote participation in a network determined by a beacon having an SSID that matches an SSID included in communication parameters of a wireless LAN that are set to be valid in the management table. With such control, participation in a once-participated network is automatically performed, thereby saving the user's burden in establishing a connection for the second time and so on.

The description returns to FIG. 3A.

The image loading app 301 has the following two functions. One is the function of connecting to the digital camera 100 via a wireless LAN using the communication parameters of the wireless LAN, received through near-field wireless communication. The other is the function of receiving image data in the recording medium 110 of the digital camera 100, and saving the image data in the recording medium 210. In addition, the image loading app 301 cooperates with the OS 304 to implement services with the use of following modules.

A wireless LAN service control module 302 performs processing of saving communication parameters for establishing a wireless LAN connection, and processing of giving a command to the OS 304 to perform on/off control of a wireless LAN.

An NFC service control module 303 performs processing of receiving NFC communication data, analyzing the received data, and extracting communication parameters for establishing a wireless LAN connection. In addition, the NFC service control module 303 performs processing of giving a command to the OS 304 to transmit NFC communication data for progressing connection processing to the digital camera 100.

Overview of Wireless Communication Procedure

Next, the flow of performing communication between the digital camera 100 and the mobile phone 200 via a wireless LAN will be described.

In this embodiment, the following two types of procedures for the digital camera 100 and the mobile phone 200 to start a wireless LAN connection will be described. Namely, the two types are the procedure of establishing a wireless LAN connection in response to the user operating both the digital camera 100 and the mobile phone 200, and the procedure of establishing a wireless LAN connection using NFC.

First, the procedure of establishing a connection in response to the user performing operation in accordance with a guidance on the screen of the mobile phone 200 will be described using FIG. 4A.

Figure 4A:
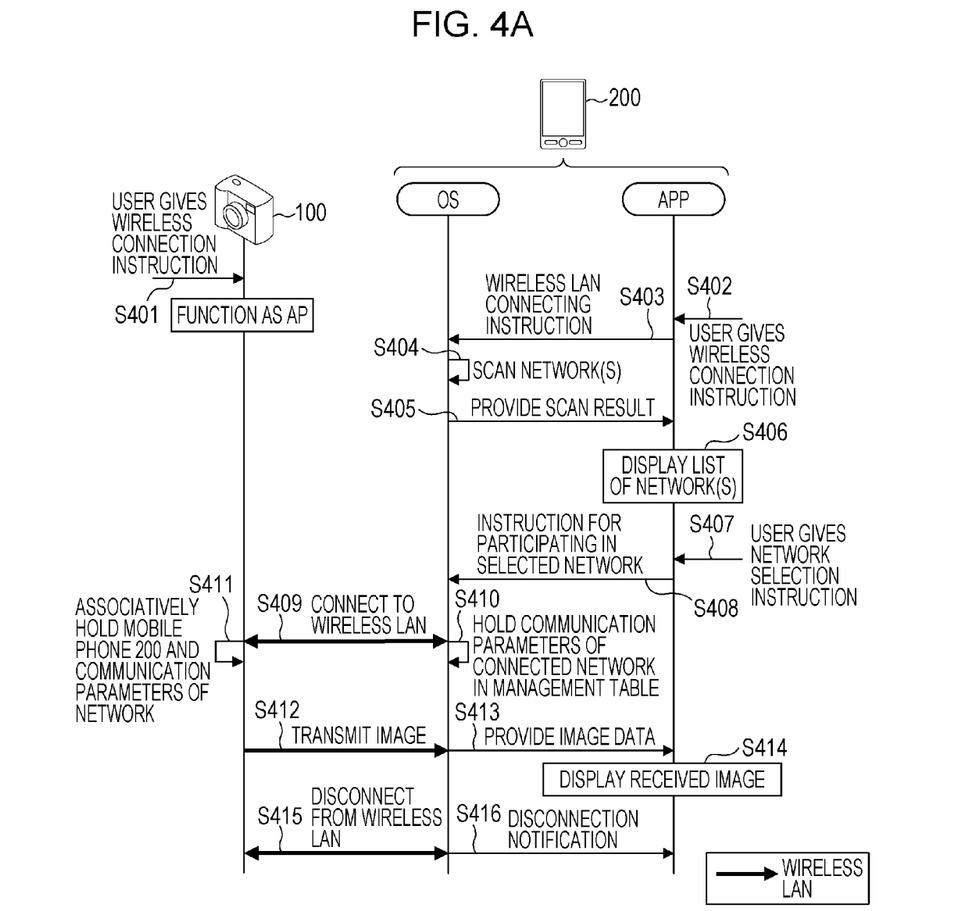
FIG. 4A is a sequence diagram in the case where a user operates devices to establish a wireless LAN connection in a communication system according to the first embodiment.

In FIG. 4A, first, the digital camera 100 activates a simple access point function through a menu operation performed by the user, for example, in step S401. In this case, a value input by a user operation is used as a communication parameter of a network generated as an access point. As a result, the digital camera 100 starts broadcasting a beacon including part of communication parameters (here, an SSID), and generates a network.

In contrast, the mobile phone 200 activates an app for communicating with the digital camera 100, which is already installed in the mobile phone 200, and accepts selection of an icon for starting a wireless LAN connection, displayed by the app on the display unit 206, for example (S402).

In response to this, the app transmits an instruction for starting a wireless LAN connection to the OS in step S403.

The OS, which has received this instruction, scans a network(s) in S404. That is, the OS receives a beacon(s) being broadcast around.

In step S405, the OS provides the app with information regarding the received beacon(s) as the result of scanning.

The app, which has received this, makes a list of networks around, and displays the list of networks on the display unit 206 in step S406. As a result, for example, SSIDs included in the received beacons are listed on the display unit 206 of the mobile phone 200. Here, an SSID included in a beacon sent from the digital camera 100 is also displayed.

In step S407, the app accepts an input for selecting the SSID included in the beacon sent from the digital camera 100, from among the listed SSIDs. In order to select this SSID, this SSID may be displayed on the display unit 106 of the digital camera 100. In doing so, the user can look for the SSID of the digital camera 100 from the SSIDs listed on the mobile phone 200 while looking at the SSID displayed on the display unit 106 of the digital camera 100.

Once the SSID is selected, the app gives an instruction to the OS to participate in the selected network in step S408.

In response to this instruction, the OS establishes a wireless LAN connection with the digital camera 100 in step S409. Specifically, through a request for participating in a wireless LAN and a permission given from the digital camera 100, the OS participates in a network generated by the digital camera 100. In addition, communication at the level of an application layer is also established via the OS between the digital camera 100 and the app.

Further, the OS holds the communication parameters of the network, participated in step S409, in a network communication parameter management table managed by the OS in step S410.

Similarly, the digital camera 100 holds information on the mobile phone 200, to which a connection has been established, and the communication parameters used in a network at the time of establishing a connection with the mobile phone 200, in association with each other in step S411.

Here, information held in each device is used when, for example, the digital camera 100 and the mobile phone 200 establish a connection again via a wireless LAN. Specifically, a wireless LAN connection is established by making a list of recorded communication parameters on each device and simply having the user select one from among the listed communication parameters. In other words, the burden of inputting an SSID and a password, or the burden of waiting for network scanning can be omitted.

Thereafter in S412, the digital camera 100 transmits image data to the mobile phone 200. Here, for example, an image may be automatically transmitted in response to completion of establishing a wireless LAN connection, or, before that, the user of the digital camera 100 may be allowed to select an image to transmit. The OS, which has received the image, provides the app with the image data in step S413.

In step S414, the app displays the provided image data on the display unit 206, and causes the user to grasp the details of the received image data. Accordingly, the image data in the digital camera 100 is loaded to the mobile phone 200.

In response to completion of loading the image data, the wireless LAN connection between the digital camera 100 and the mobile phone 200 is disconnected (S415), and the OS notifies the app thereof (S416). This disconnection may be done in response to a request automatically given from the digital camera 100, or in response to a request from the app.

The above is the description of the procedure of establishing a wireless LAN connection in response to the user operating both the digital camera 100 and the mobile phone 200.

Next, the procedure of establishing a wireless LAN connection using NFC will be described using FIG. 4B. In this procedure, a user operation necessary for establishing a wireless LAN connection is simply bringing the digital camera 100 and the mobile phone 200 close to each other.

Figure 4B:
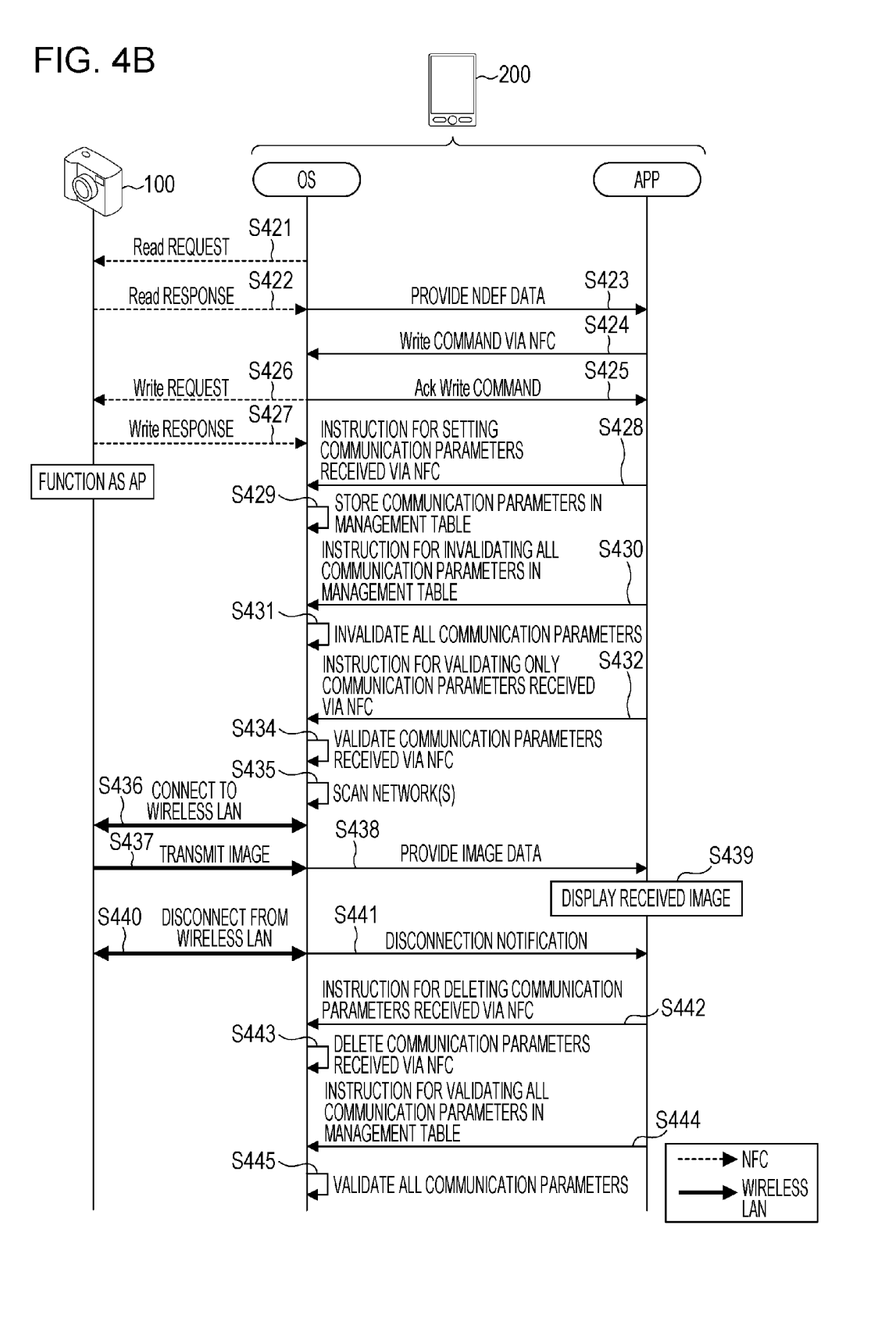
FIG. 4B is a sequence diagram in the case where a wireless LAN connection is established using NFC in the communication system according to the first embodiment.

That is, the sequence in FIG. 4B is started in response to bringing the near-field wireless communication unit 112 of the digital camera 100 and the near-field wireless communication unit 212 of the mobile phone 200 close to each other.

First in step S421, the OS transmits a Read request to the near-field wireless communication unit 112 of the digital camera 100.

In response to this, the near-field wireless communication unit 112 of the digital camera 100 transmits a Read response. The Read response includes data written in accordance with NDEF. Here, the digital camera 100 writes an SSID and a password, randomly generated in advance, in a memory (not illustrated) in the near-field wireless communication unit 112, and, upon receipt of a Read request, returns a Read response including the SSID and the password. The SSID and the password are used as the communication parameters of a network generated by the digital camera 100 in the case of establishing a wireless LAN connection using NFC. That is, the mobile phone 200 shares the communication parameters of a wireless LAN with the digital camera 100 via NFC.

In step S423, the OS decomposes and analyzes the read data, converts the data to a format that the app can understand, and provides the app with the data.

The app, which has received this, gives a Write command to the OS in order to convey to the digital camera 100 that "reading is completed" via NFC in step S424. The OS notifies the app of information indicating that this command is accepted (S425), and further transmits a Write request to the near-field wireless communication unit 112 of the digital camera via the near-field wireless communication unit 212 (S426). Here, information to be written includes information that causes the digital camera 100 to determine that reading of data via NFC is completed. Specifically, a certain flag is written in a certain recording area. By referring to this flag, the digital camera 100 determines whether the mobile phone 200 has completed reading.

Upon receipt of the Write request, in step S427, the near-field wireless communication unit 112 of the digital camera 100 transmits a Write response, and the digital camera 100 automatically activates the simple access point function. As described above, in this state, a network is generated using the SSID and the password transmitted via NFC in step S422.

Note that the processing in steps S424 to S427 is necessary for the following reason. That is, in this communication using NFC, whereas an operation for starting communication is direct and simple, the communicable distance is short. It is thus necessary for the user to manually place the devices within a communicable distance. In other words, the communication may be easily interrupted depending on a user action. Therefore, for example, the mobile phone 200 may not be sufficiently receive a Read response from the digital camera 100. In such a case, it is useless to activate the access point function of the digital camera 100. This is because the mobile phone 200 has failed to obtain information for participating in a network generated by the access point of the digital camera 100, and the mobile phone 200 is thus unable to participate in the network. To this end, the simple access point function is activated for the first time in response to notification, through Write, of normal completion of reception of a Read response. In doing so, the possibility of uselessly activating the simple access point function can be reduced.

In contrast, in step S428, the app of the mobile phone 200 gives an instruction to hold, in the management table, the communication parameters (here, the SSID and the password) included in data provided from the OS in step S423. In response to this, the OS holds the communication parameters in the management table in step S429.

Further, the app of the mobile phone 200 gives an instruction to invalidate once all the communication parameters held in the management table in step S430. In response to this, the OS invalidates all the communication parameters held in the management table in step S431. In fact, the app gives an instruction to the OS to invalidate the communication parameters one by one. By invalidating the communication parameters, for example, the mobile phone 200 is disconnected from the currently participating network.

Next, in step S432, the app of the mobile phone 200 gives an instruction to validate the communication parameters for which the instruction has been given to be held in the management table in step S428 (that is, the communication parameters of a network generated by the digital camera 100). In response to this, in step S434, the OS validates the communication parameters for which the instruction has been given to be held in the management table in step S428 (since the communication parameters have been invalidated once in step S431). As a result, only the communication parameters for which the instruction has been given to be held in the management table in step S428 are validated and left in the management table.

Next in step S435, the OS scans a network(s), and accordingly receives a beacon(s) sent from a peripheral device(s). The OS compares an SSID included in each beacon with an SSID included in valid communication parameters in the management table, and tries to participate in a network having the matching SSID. Here, since the valid communication parameters are only the communication parameters of a network generated by the digital camera 100, the OS transmits a participation request to the network generated by the digital camera 100. The scanning, comparison with information in the management table, and trying to participate in the network need not necessarily be performed in response to completion of step S433, and may be performed periodically, for example.

As described above, by adding information received via NFC to a log, the mobile phone 200 can automatically participate in a network of the digital camera 100 as if the mobile phone 200 were a device that has connected to the network in the past.

Note that the reason for performing the processing in steps S428 and S429 before the processing in steps S430 and S431 is as follows. That is, it takes a shorter time to establish a wireless LAN connection when the communication parameters are given to the OS first than when the communication parameters are given to the OS after the processing in steps S430 and S431. This is because the OS needs time to analyze the given communication parameters. Just holding the communication parameters in the management table will not promptly proceed to a wireless LAN connection.

As a result, in step S436, a wireless LAN connection is established between the digital camera 100 and the mobile phone 200. In conjunction with this, communication at the level of an application layer is established via the OS between the digital camera 100 and the app.

Because a connection established using NFC is highly likely to be a temporary connection, the digital camera 100 does not associatively hold information on the mobile phone 200 and the communication parameters.

Thereafter, the digital camera 100 transmits image data to the mobile phone 200 in S437. Here, for example, an image may be automatically transmitted in response to completion of establishing a wireless LAN connection, or, before that, the user of the digital camera 100 may be allowed to select an image to transmit. The OS, which has received the image, provides the app with the image data in step S438.

In step S439, the app displays the provided image data on the display unit 206, and causes the user to grasp the details of the received image data. Accordingly, the image data in the digital camera 100 is loaded to the mobile phone 200.

In response to completion of loading the image data, the wireless LAN connection between the digital camera 100 and the mobile phone 200 is disconnected (S440), and the OS notifies the app thereof (S441). This disconnection may be done in response to a request automatically given from the digital camera 100, or in response to a request from the app.

The procedure of establishing a wireless LAN connection using NFC is not completed here.

Next, in step S442, the app gives an instruction to the OS to delete the communication parameters for which the instruction has been given to be held in the management table in step S428 (that is, the communication parameters of a network generated by the digital camera 100) from the management table. In response to this, in step S443, the OS deletes the communication parameters for which the instruction has been given to be held in the management table in step S430 from the management table. In doing so, the useless communication parameters are prevented from being left in the management table.

Further, the app gives an instruction to validate all the communication parameters held in the management table in step S444. In response to this, the OS validates all the communication parameters held in the management table in step S445. Here, like step S432, the app actually gives an instruction to the OS to validate the communication parameters one by one. In order to simplify the description, the case where all the communication parameters are validated has been discussed here. However, for example, the communication parameters may be restored to their original statuses. In this case, before the app gives an instruction in step S430 to invalidate all the communication parameters held in the management table, it is only necessary to hold the statuses of the communication parameters, and in S445 the app simply gives an instruction to refer to the held statuses and to restore the communication parameters to their original statuses.

The above is the description of the procedure of establishing a wireless LAN connection using NFC.

Flowchart

Next, the operation of each device for implementing the procedures of FIG. 4A and FIG. 4B described above will be described.

Figure 5A:
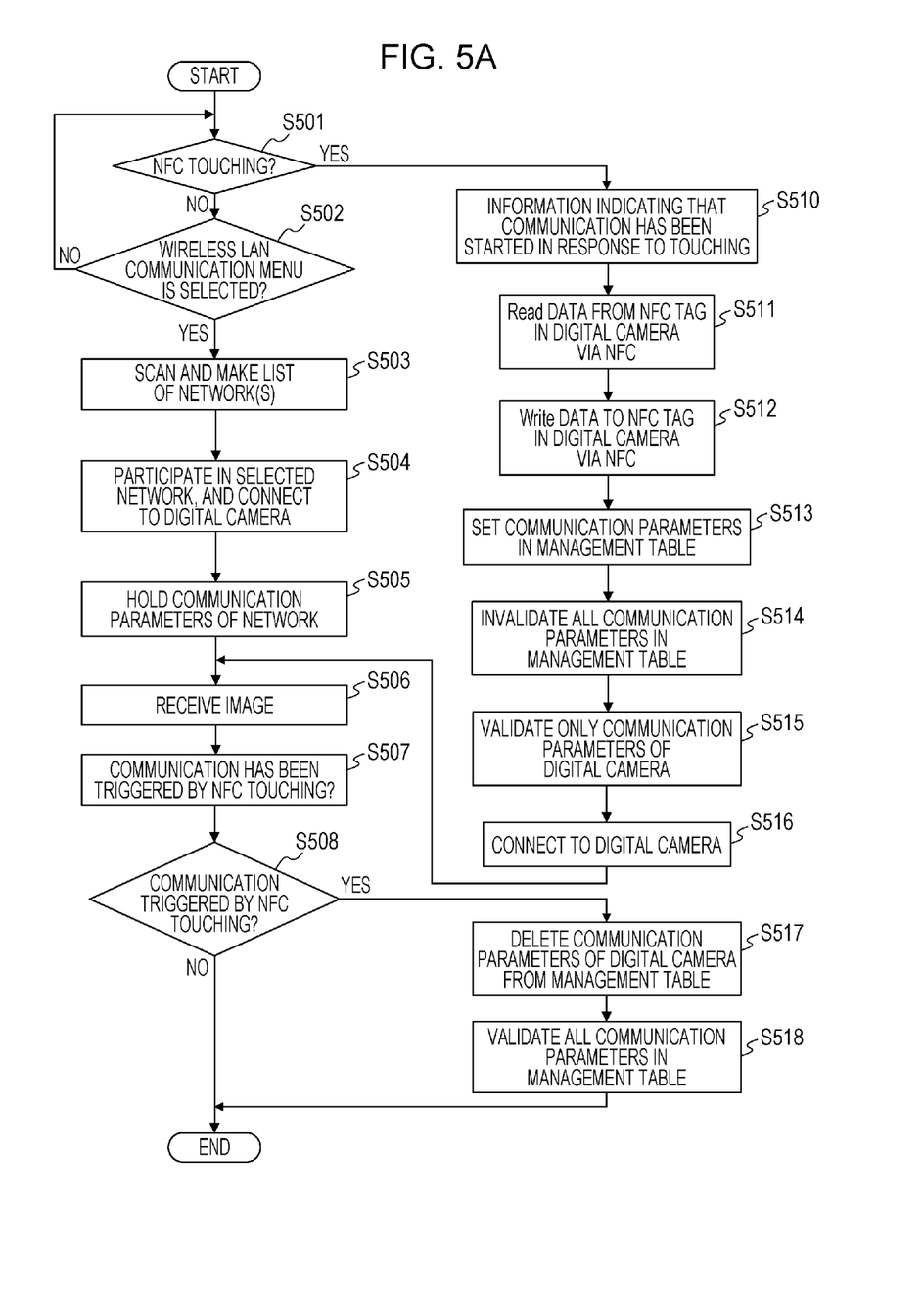
FIG. 5A is a flowchart illustrating the operation of the mobile phone 200 according to the first embodiment.

FIG. 5A is a flowchart illustrating the operation of the mobile phone 200. The processing of this flowchart is implemented by the controller 201 of the mobile phone 200, which reads the OS 304 and the image loading app 301 from the non-volatile memory 203 and expands and executes the OS 304 and the image loading app 301 in the work memory 204. In the following description of the flowchart, in order to simplify the description, no distinction is made in description between control of the OS 304 and the image loading app 301. The distinction is as illustrated in the sequences of FIG. 4A and FIG. 4B. The processing of this flowchart is started in response to turning ON the power of the mobile phone 200 and completion of activation of the OS 304.

First in step S501, the controller 201 determines whether the near-field wireless communication unit 212 of the mobile phone 200 has been brought close to the near-field wireless communication unit 112 of the digital camera 100. In other words, it is determined whether there has been touching in order to use the NFC function.

In the case where the controller 201 determines that there has not been touching, the processing proceeds to step S502.

In step S502, the controller 201 determines whether a menu for performing communication using a wireless LAN has been selected by the user via the operation unit 205.

In the case where it is determined that the menu has not been selected, the processing returns to step S501, repeats the determinations in steps S501 and S502, and stands by until there has been touching or the menu has been selected.

First, the case in which it is determined in step S502 that the menu has been selected will be described. In this case, the processing proceeds to step S503.

In step S503, the controller 201 scans and makes a list of peripheral networks. That is, the controller 201 receives beacons sent from peripheral devices and displays a list of SSIDs included in the beacons on the display unit 206. In conjunction with this, the controller 201 accepts, from the user, selection of a network that the user wants to participate in. By selecting any of the SSIDs displayed in the list, the user can give an instruction on selection of a network that the user wants to participate in. The processing in this step corresponds to the processing in steps S404 to S407 in FIG. 4A. In the following description, it is assumed that the user has selected a network generated by the digital camera 100.

Having accepted the selection, the controller 201 participates in the selected network in step S504. Specifically, the controller 201 transmits a participation request to the selected network (that is, a network generated by the digital camera 100). In response to this, the digital camera transmits a permission response. Through reception of the permission response, authentication processing, and so forth, participation in the network is completed. In conjunction with this participation in the network, communication at the level of an application is also established between the digital camera 100 and the mobile phone 200. The processing in this step corresponds to the processing in steps S408 and S409 in FIG. 4A.

In step S505, the controller 201 holds the communication parameters of the network in the management table 350 described with reference to FIG. 3B, and prepares for the next connection. The processing in this step corresponds to the processing in step S410 in FIG. 4A.

Next, in step S506, the controller 201 receives image data transmitted from the digital camera 100. Accordingly, the image data in the digital camera 100 is loaded to the mobile phone 200. The processing in this step corresponds to the processing in steps S412 and S413 in FIG. 4A and to the processing in steps S437 to S439 in FIG. 4B.

In response to completion of the loading of the image data, the controller 201 disconnects the communication with the digital camera 100. Here, the controller 201 not only disconnects the communication at an application level with the digital camera 100, but also withdraws from the network generated by the digital camera 100. The processing in this step corresponds to the processing in steps S415 and S416 in FIG. 4A and to the processing in steps S440 and S441 in FIG. 4B.

The above is the description of the case in which the controller 201 determines in step S502 that the menu has been selected. Processing from this point onward will be described later.

Next, the case in which the controller 201 determines in step S501 that there has been touching will be described. In this case, the processing proceeds to step S510.

In step S510, the controller 201 holds, in the work memory 204, information indicating that communication in response to NFC touching has been started.

In step S511, the controller 201 reads data from the near-field wireless communication unit 112 of the digital camera 100 using NFC communication via the near-field wireless communication unit 212. Specifically, the controller 201 transmits a Read request, and receives a response to the Read request, thereby receiving data included in the response. The data includes the communication parameters (here, the SSID and the password) of a network generated at the time the digital camera 100 starts functioning as an access point. The processing in this step corresponds to the processing in steps S421 to S423 in FIG. 4B.

Next, in step S512, the controller 201 writes information indicating that reading of data is completed in the near-field wireless communication unit 112 of the digital camera 100 using NFC communication via the near-field wireless communication unit 212. The processing in this step corresponds to the processing in steps S424 to S426 in FIG. 4B.

Once writing of the information is completed, in step S513, the controller 201 records, in the management table described with reference to FIG. 3B, the SSID and the password received in step S511 (that is, the communication parameters of a network generated by the digital camera 100). The processing in this step corresponds to the processing in steps S428 and S429 in FIG. 4B.

In step S514, the controller 201 invalidates once all the communication parameters recorded in the management table, and withdraws from the network that the mobile phone 200 is currently participating in. Note that this processing is executed regardless of whether or not the mobile phone 200 has already participated in the network. The processing in this step corresponds to the processing in steps S430 and S431 in FIG. 4B.

Next, in step S515, the controller 201 validates only the SSID and the password recorded in step S513. The processing in this step corresponds to the processing in steps S432 to S434 in FIG. 4B.

In step S516, the controller 201 scans peripheral networks, performs comparison with the valid SSID recorded in the management table, and participates in a network having the matching SSID. Here, the valid SSID is only one that has been validated in step S515, and this SSID is included in the communication parameters of a network generated by the digital camera. As a result, in this step, the controller 201 participates in a network generated by the digital camera 100. In conjunction with this participation in the network, communication at the level of an application is also established between the digital camera 100 and the mobile phone 200. The processing in this step corresponds to the processing in steps S435 and S436 in FIG. 4B. Thereafter, the processing proceeds to step S506.

The above is the description of the case in which the controller 201 determines in step S501 that there has been touching.

In step S508, the controller 201 determines whether this communication is communication triggered by NFC touching. Here, the determination is made by referring the work memory 204 and determining whether the work memory 204 holds information indicating that the communication has been started in response to touching described in step S510. When such information is held, it is determined that the communication is communication triggered by NFC touching. When such information is not held, it is determined that the communication is not communication triggered by NFC touching.

In the case where the controller 201 determines in step S508 that the communication is communication triggered by NFC touching, the processing proceeds to step S517.

In step S517, the controller 201 deletes the communication parameters of a network generated by the digital camera, set in the management table in step S513, from the management table. The processing in this step corresponds to the processing in steps S442 and S443 in FIG. 4B.

In step S518, the controller 201 validates all the communication parameters held in the management table. The processing in this step corresponds to the processing in steps S444 and S445 in FIG. 4B. Thereafter, the processing ends.

In contrast, in the case where the controller 201 determines in step S508 that the communication is not communication triggered by NFC touching, the processing of this flowchart ends without going through steps S517 and S518.

The above is the description of the operation of the mobile phone 200 according to this embodiment.

Figure 5B:
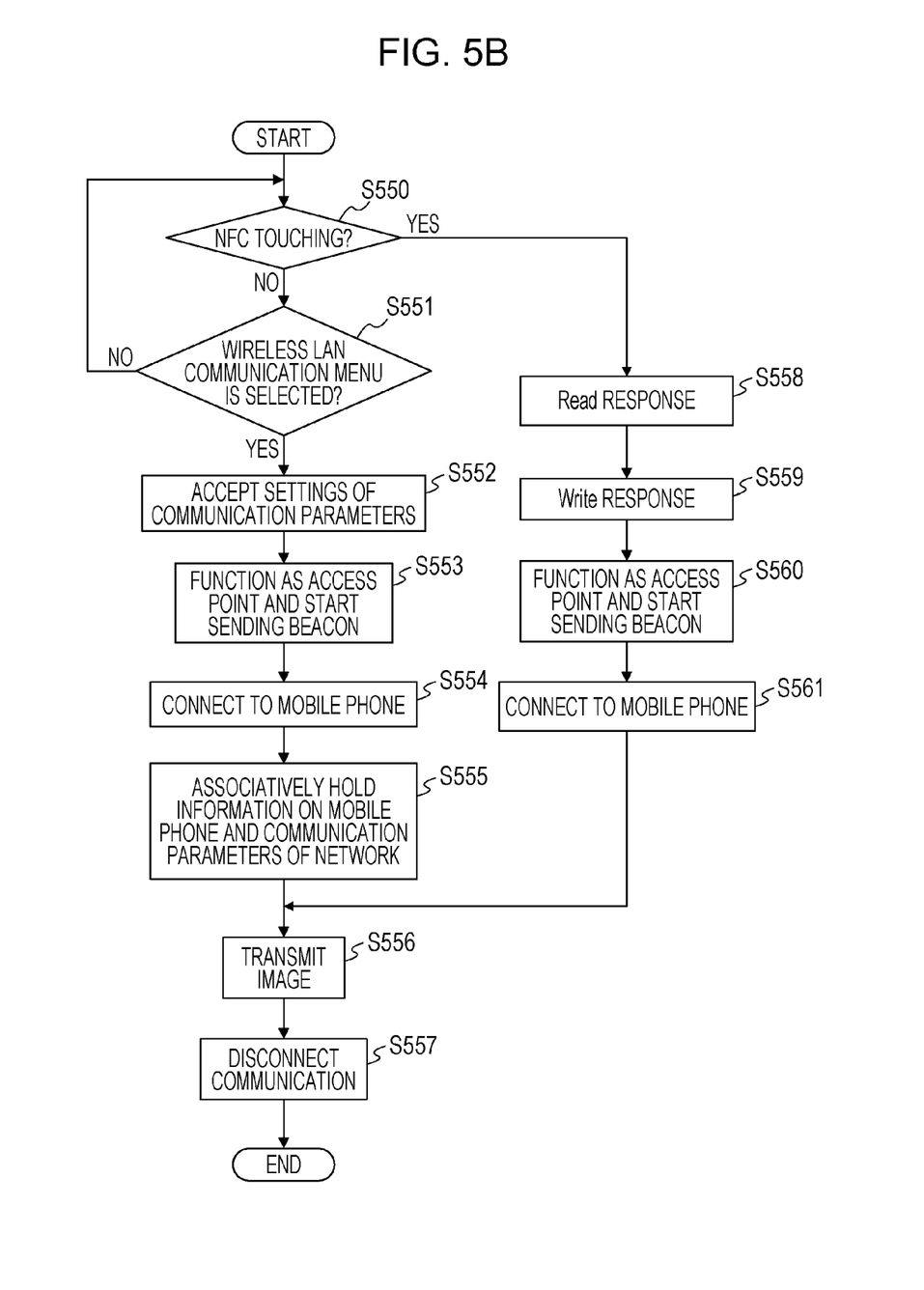
FIG. 5B is a flowchart illustrating the operation of the digital camera 100 according to the first embodiment.

Next, the operation of the digital camera 100 will be described.

FIG. 5B is a flowchart illustrating the operation of the digital camera 100. The processing of this flowchart is implemented by the controller 101 of the digital camera 100, which reads a control program from the non-volatile memory 103 and expands and executes the control program in the work memory 104. The processing of this flowchart is started in response to turning ON the power of the digital camera 100 and completion of activation of the control program.

First in step S550, the controller 101 determines whether the near-field wireless communication unit 112 of the digital camera 100 has been brought close to the near-field wireless communication unit 212 of the mobile phone 200. In other words, it is determined whether there has been touching in order to use the NFC function.

In the case where the controller 101 determines that there has not been touching, the processing proceeds to step S551.

In step S551, the controller 101 determines whether a menu for performing communication using a wireless LAN has been selected by the user via the operation unit 105.

In the case where it is determined that the menu has not been selected, the processing returns to step S550, repeats the determinations in steps S550 and S551, and stands by until there has been touching or the menu has been selected.

First, the case in which it is determined in step S551 that the menu has been selected will be described. In this case, the processing proceeds to step S552.

In step S552, the controller 101 accepts settings of communication parameters from the user via the operation unit 105. Here, the controller 101 accepts at least an entry of a character string used as an SSID, and an entry of a character string used as a password. In acceptance of these entries, for example, a software keyboard may be displayed and entries may be accepted, or randomly generated character strings may be selected by the user. The processing in this step corresponds to the processing in step S401 in FIG. 4A.

In step S553, the controller 101 activates the simple access point function, and generates a network using the parameters set in step S552. Specifically, the controller 101 starts broadcasting a beacon including the SSID set in step S552.

In step S554, the controller 101 causes the mobile phone 200 to participate in the network generated in step S553. Specifically, the controller 101 receives a network participation request from the mobile phone 200, which has received the beacon whose broadcast was started in step S553, permits the participation request, and performs authentication processing with the mobile phone 200, thereby causing the mobile phone 200 to participate in the network. In conjunction with this participation in the network, communication at the level of an application is also established between the digital camera 100 and the mobile phone 200. Thereafter, the processing proceeds to step S555. The processing in this step corresponds to the processing in step S409 in FIG. 4A.

In step S555, the controller 101 associatively records, in the non-volatile memory 103, information on the mobile phone 200 with which communication has been established, and the communication parameters of the currently generated network. In doing so, the communication procedure for the next time onward is simplified. The processing in this step corresponds to the processing in step S411 in FIG. 4A.

Next, in step S556, the controller 101 transmits image data recorded in the recording medium 110 to the mobile phone 200 via the connection unit 111. The processing in this step corresponds to the processing in step S412 in FIG. 4A and S437 in FIG. 4B.

In response to completion of the transmission of the image data, the controller 101 disconnects the communication with the mobile phone 200 in step S557. In conjunction with this, the controller 101 ends the simple access point function. That is, the controller 101 ends broadcasting the beacon. Thereafter, this flowchart ends. The processing in this step corresponds to the processing in step S415 in FIG. 4A and step S440 in FIG. 4B.

Next, the case in which the controller 101 determines in step S550 that there has been touching will be described. In this case, the processing proceeds to step S558.

In step S558, the controller 101 returns a Read response to a Read request from the mobile phone 200. This response includes communication parameters that are randomly generated in advance (an SSID and a password with randomly generated character strings). The processing in this step corresponds to the processing in step S422 in FIG. 4B.

In step S559, the controller 101 returns a Write response to a Write request from the mobile phone 200. In response to returning the Write response, the processing proceeds to step S560. The processing in this step corresponds to the processing in step S427 in FIG. 4B.

In step S560, the controller 101 activates the simple access point function, and generates a network using the communication parameters transmitted in step S558. Specifically, the controller 101 starts broadcasting a beacon including the SSID transmitted in step S558.

In step S561, the controller 101 causes the mobile phone 200 to participate in the network generated in step S560. In conjunction with this participation in the network, communication at the level of an application is also established between the digital camera 100 and the mobile phone 200. The processing in this step corresponds to the processing in step S436 in FIG. 4B. Thereafter, the processing proceeds to step S556. The processing in steps S556 and S557 thereafter is as described above.

The above is the description of the case in which the controller 101 determines in step S550 that there has been touching.

The operation of the digital camera 100 according to this embodiment has been described as above.

In the case of establishing a wireless LAN connection using NFC, the app in the mobile phone 200 according to this embodiment deletes communication parameters used in establishing the wireless LAN connection from information managed by the OS. Doing so achieves both maintaining the security and preventing useless logs from being left.

In the above-described embodiment, although problems in the case of randomly generating communication parameters in view of the security have been described, the operation according to this embodiment can also overcome disadvantages in the case of having fixed communication parameters.

This is because that, in the case of having fixed communication parameters, when a digital camera tries to connect to a mobile phone, if another mobile phone that has been previously connected via a wireless LAN using NFC is nearby, this mobile phone, which has been previously connected, may first connect to the digital camera. As a result, a connection with a new mobile phone may be hindered. Even in such a case, a connection with a new mobile phone can be smoothly established if the log of a mobile phone that has been previously connected via a wireless LAN using NFC is deleted.

Other Embodiments

In the above-described embodiment, the case has been described by way of example in which, in wireless LAN communication between the mobile phone 200 and the digital camera 100, the mobile phone 200 executes the function of receiving image data from the digital camera 100. With regard to this, other functions may be executed. Other functions that may be executed include, for example, the function of transmitting, to the digital camera 100, image data captured by the image capturer 202 of the mobile phone 200 or image data downloaded from the Internet via the public network connection unit 213 of the mobile phone 200. Further, the function of remote-controlling the digital camera 100 from the mobile phone 200 is conceivable. In addition, content to be exchanged include not only image data, but also moving image data, text data, audio data, or music data.

In the above-described embodiment, after the withdrawal from the network of the digital camera 100 in step S440 in FIG. 4B, the wireless LAN communication function of the mobile phone 200 remains to be turned ON. Therefore, the communication parameters that are validated in step S445 thereafter can be compared with the result of network scanning that is periodically executed even after the processing in FIG. 4B ends. For example, in a state where the mobile phone 200 is connected to an access point at home, it is considered that scenes where the mobile phone 200 tries to communicate with the digital camera 100 occur frequently. In such a case, in order to communicate with the digital camera 100, the mobile phone 200 withdraws once from the network of the access point at home; when communication with the digital camera 100 ends, the mobile phone 200 automatically participates again in the network of the access point at home. That is, a system with great usability can be provided by not only deleting the log, but also restoring the communication parameters to the original status, thereby enabling automatic participation again in the original access point network.

The present invention is also implemented by executing the following processing. That is, the processing is supplying software (program) that implements the functions of the above-described embodiment to a system or an apparatus via a network or various types of storage media, and reading and executing the program by a computer (or a CPU, an MPU, etc.) of the system or the apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2014/069726, filed Jul. 25, 2014, which is hereby incorporated by reference herein in its entirety.

The invention claimed is:

1. A communication apparatus comprising:
a first wireless communication unit;
a second wireless communication unit; and
a control unit configured to establish a connection with an external apparatus via the second wireless communication unit according to a procedure selected from among a plurality of procedures including a first procedure and a second procedure,
wherein the first procedure comprises:
sharing, via the first wireless communication unit, a communication parameter for establishing a connection with the external apparatus,
holding the shared communication parameter, and
establishing, via the second wireless communication unit, the connection with the external apparatus based on the shared communication parameter,
wherein the second procedure comprises:
receiving, from a user, a communication parameter for establishing a connection with the external apparatus,
holding the received communication parameter, and
establishing, via the second wireless communication unit, the connection with the external apparatus based on the received communication parameter,
wherein, if the connection with the external apparatus that is established via the first procedure is disconnected, the control unit deletes the communication parameter used in the disconnected connection, among communication parameters, and
wherein, if the connection with the external apparatus that is established via the second procedure is disconnected, the control unit does not delete the communication parameter used in the disconnected connection, among communication parameters.

2. The communication apparatus according to claim 1, wherein power necessary for an operation of the first communication unit is lower than power necessary for an operation of the second communication unit.

3. The communication apparatus according to claim 1, wherein the control unit invalidates, in a case where the communication parameter shared via the first communication unit is held, another communication parameter that has already been held.

4. The communication apparatus according to claim 3, wherein the control unit validates the another communication parameter, in response to disconnection of the connection with the external apparatus that is established via the first procedure.

5. The communication apparatus according to claim 1, wherein the control unit controls the second connection unit to establish a connection again with the external apparatus by using a communication parameter selected by a user operation from among communication parameters held in the second procedure.

6. The communication apparatus according to claim 5, wherein, in a case where a plurality of beacons is retrieved, the control unit performs control to prompt participation in, among networks indicated by the plurality of beacons, a network determined based on each beacon and a communication parameter that is held in a valid status.

7. The communication apparatus according to claim 6, wherein an invalidated communication parameter is not used as a condition for determining a network to participate in.

8. The communication apparatus according to claim 6, wherein beacon retrieval is continued after the communication parameter is deleted.

9. The communication apparatus according to claim 6, further comprising a third communication unit,
wherein, in a case where a relationship between a communication parameter that is held in a valid status and the beacon satisfies a certain relationship in a state where no call is being made, control is performed to give priority to participation in a network of a device that sends the beacon over connection to a public network.

10. The communication apparatus according to claim 1, wherein, in a case where a connection with the external apparatus is established, content is transmitted, received, or transmitted and received via the first communication unit.

11. The communication apparatus according to claim 10, wherein the control unit disconnects the connection with the external apparatus in response to completion of transmission, reception, or transmission and reception of the content.

12. The communication apparatus according to claim 10, further comprising an image capturing unit,
wherein the content is image data obtained by image capturing performed by the image capturing unit.

13. The communication apparatus according to claim 10, wherein the external apparatus includes an image capturer, and
wherein the content is image data obtained by image capturing performed by the image capturer.

14. A control method for a communication apparatus including a first wireless communication unit and a second wireless communication unit, comprising, using at least one controller:
establishing a connection with an external apparatus via the second wireless communication unit according to a procedure selected from among a plurality of procedures including a first procedure and a second procedure,
wherein the first procedure comprises:
sharing, via the first wireless communication unit, a communication parameter for establishing a connection with the external apparatus,
holding the shared communication parameter, and
establishing the connection with the external apparatus based on the shared communication parameter via the second wireless communication unit,
wherein the second procedure comprises:
receiving, from a user, a communication parameter for establishing a connection with the external apparatus,
holding the received communication parameter, and
establishing the connection with the external apparatus based on the received communication parameter via the second wireless communication unit, wherein, if the connection with the external apparatus that is established through the first procedure is disconnected, the communication parameter used in the disconnected connection, among communication parameters, is deleted, and wherein, if the connection with the external apparatus that is established through the second procedure is disconnected, the communication parameter used in the disconnected connection, among communication parameters, is retained.

15. A non-transitory computer-readable storage medium storing a program for causing a computer to execute a control method for a communication apparatus including a first wireless communication unit and a second wireless communication unit, the method comprising:

establishing a connection with an external apparatus via the second wireless communication unit according to a procedure selected from among a plurality of procedures including a first procedure and a second procedure, wherein the first procedure comprises:

sharing, via the first wireless communication unit, a communication parameter for establishing a connection with the external apparatus, holding the shared communication parameter, and establishing the connection with the external apparatus based on the shared communication parameter via the second wireless communication unit, wherein the second procedure comprises:

receiving, from a user, a communication parameter for establishing a connection with the external apparatus, holding the received communication parameter, and establishing the connection with the external apparatus based on the received communication parameter via the second wireless communication unit, wherein, if the connection with the external apparatus that is established through the first procedure is disconnected, the communication parameter used in the disconnected connection, among communication parameters, is deleted, and wherein, if the connection with the external apparatus that is established through the second procedure is disconnected, the communication parameter used in the disconnected connection, among communication parameters, is retained.

* * * * *